2,713,818

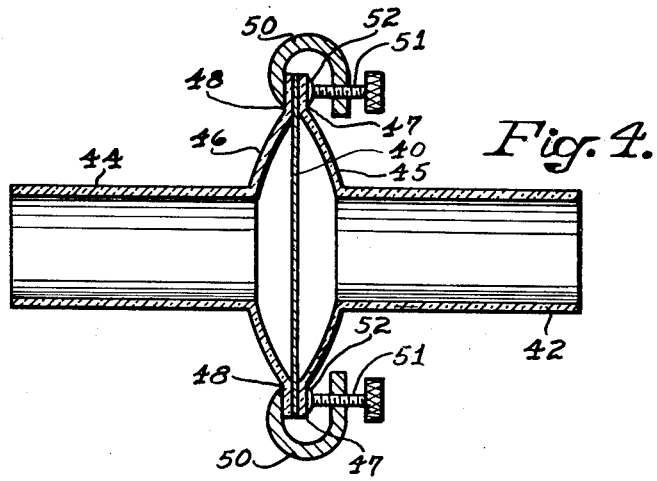
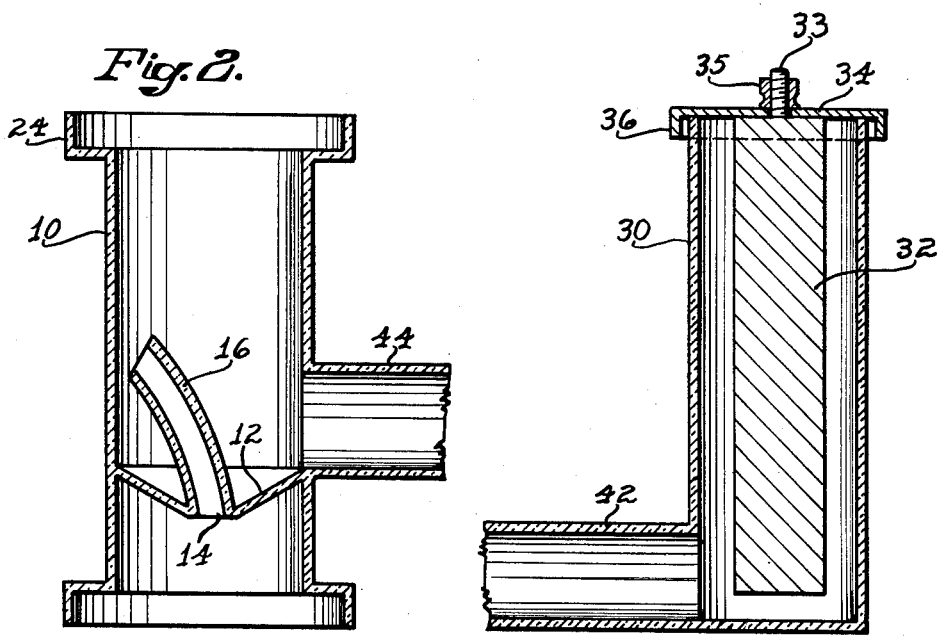

ELECTRICAL FLUID TREATING APPARATUS

Robert J. Herbold, Denver, Colo., assignor to Winger Dairy Products Processing & Manufacturing Corporation, Denver, Colo., a corporation of Colorado Application July 20, 1953, Serial No. 368,982

5 Claims. (Cl. 99—253)

This invention relates to electrical apparatus for treating fluids, and more particularly to an apparatus of the type shown in the U. S. patent to Goucher #918,531 of April 20, 1909.

Milk has been treated for the purpose of sterilizing, pasteurizing or otherwise lowering the bacteria count by passing an alternating electric current of high voltage through small vertical streams connecting spaced reservoirs. The electricity has been introduced into the milk by means of metal electrodes which directly contact the fluid. This has resulted in the milk acquiring a bad taste or other detrimental effect, because of the direct contact of the milk with the electrode material, as well as some electrolytic action taking place in the milk at the contact surfaces of the electrodes.

It is the primary object of this invention to overcome that particular problem and to provide an apparatus for electrically treating milk and other fluids in which the electricity is introduced directly into the fluid to be treated, but without the electrodes contacting the same.

In accordance with my invention, I propose to introduce the electric current directly into a conductive electrolyte which is in electrically conductive contact with the liquid that is to be treated but is separated therefrom by an osmotic diaphragm arranged to prevent an intermixture and contamination by the electrolyte of the fluid being treated. To this end, I provide spaced reservoirs for the fluid to be treated, such as milk, which are so constructed as to provide a stream therebetween in which the electric current may be passed. The electrodes for introducing current to that stream are in separate electrolyte filled compartments spaced from the reservoirs, and the electric connection with the milk or other fluid is made through two fluid passages connected only through an osmotic diaphragm.

Hence a further object of this invention is to provide an efficient and economically used apparatus of this general class which provides for the complete isolation of the fluid to be electrically treated from the electrolyte in the electrode compartment and yet which insures adequate electrical treatment of the fluid.

Another object is to provide apparatus in which the fluid is electrically treated in streams of small cross section and wherein the electric current is conducted to the streams through terminal reservoirs connected through conductive fluid with the electrodes, but without contacting the same. Further objects will be apparent in the following disclosure.

Referring to the drawings illustrating one embodiment of the invention:

Fig. 2 is an enlarged sectional view of one of the reservoirs of the fluid treating column;

Fig. 3 is an enlarged vertical section of the electrode compartment; and

Fig. 4 is an enlarged sectional view of the diaphragm compartment connected between the electrode chamber and a reservoir of the treating apparatus.

Figure 1:
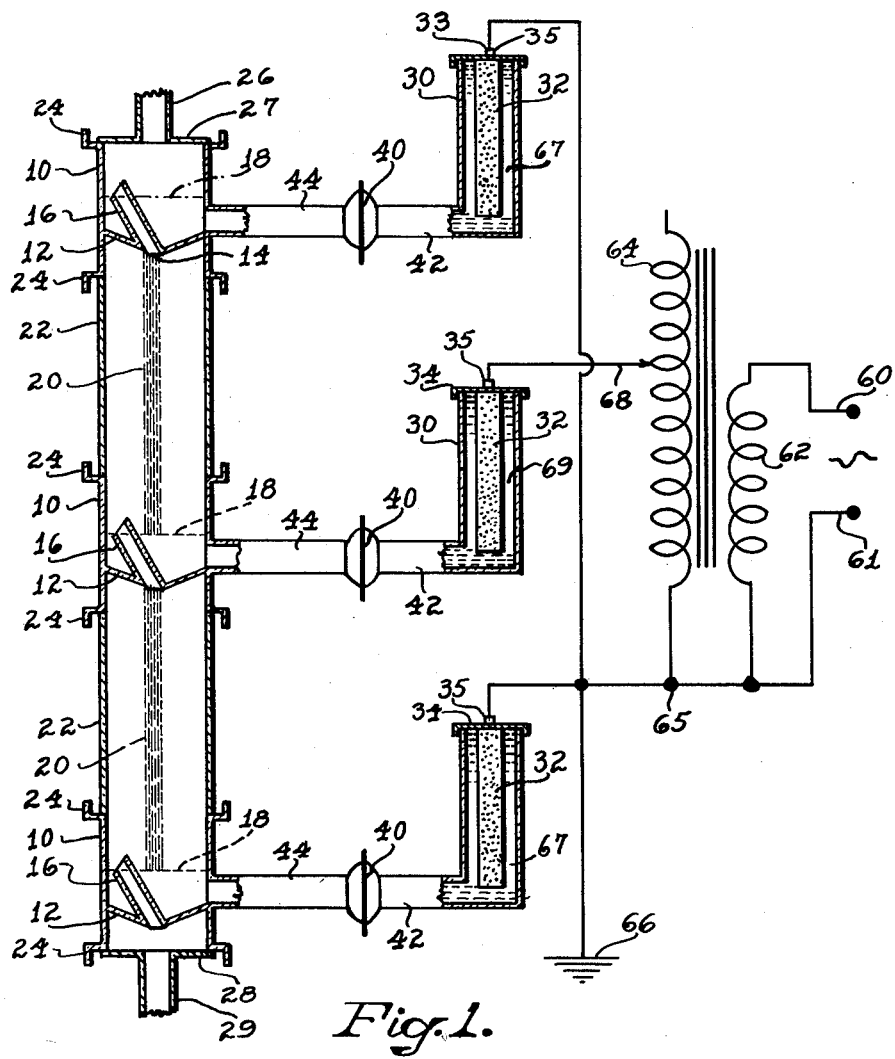
Fig. 1 is a somewhat diagrammatic vertical elevation, partly in section, of a fluid treating column and associated electrical apparatus which illustrates the operation of the device.

Although the apparatus may be employed for electrically treating various types of fluid material, it will be specifically described with reference to the treatment of milk, and it is to be understood that the various features of the apparatus and method of said Goucher patent may be employed, except as modified by this invention. The apparatus comprises a plurality of reservoir sections 10 (Figs. 1 and 2) which are so constructed and arranged that a stream of the impure fluid may be subjected to electrical action in its passing from one reservoir to the other. The reservoirs are preferably mounted in a vertical column and so arranged that the impure fluid may pass in one or more comparatively narrow streams from one to the other. These reservoir sections may be cylindrical or otherwise shaped, and each has an impervious body and a fluid supporting bottom plate 12 provided with an opening 14 through which the milk or other impure fluid may descend to the reservoir below in a stream of suitable cross section. If desired, a plurality of streams may be provided by having the plate 12 formed with several openings therethrough. In order that the fluid may maintain a definite level within the reservoir and provide a proper electrical contact with an electrolyte in the electrode compartment, an overflow pipe 16 communicates with the hole 14 through the plate 12 and extends high enough to maintain an adequate milk supply, such as indicated by the pool 18, the top of which is in line with the lowest portion of the opening at the top of the overflow pipe. That upper end of the overflow pipe 16 may be bevelled as indicated and the pipe may slope from the center opening 14 towards the side wall so as to provide a high wall adjacent the descending stream 20 in each compartment and minimize the possibility of a stream falling directly into the overflow pipe.

In order that the electricity may flow only through the fluid being treated, each reservoir section 10 is made of insulating material, such as glass, porcelain or other ceramic ware, and all parts of the apparatus are made of such material that the electricity is obliged to flow only through the fluid in the reservoirs. Any desired number of these reservoir sections may be mounted one above the other to provide adequate treatment of the milk. However, only three are shown in Fig. 1 to illustrate the operation of the invention. The electrode sections may rest one on the other, but it is preferred to employ an intermediate cylindrical section 22 of glass or other suitable material which separates the reservoirs and makes the falling stream 20 of adequate length. Different lengths of the sections 22 may be substituted to control the length of the column 20. Each reservoir section 10 may be provided with outwardly outstanding cup-like flanges 24 at the top and bottom, and if desired, gaskets may be inserted to insure adequate mounting and sealing of one section on another. It will be appreciated that various constructional features may be employed to hold the column vertical and insure strength and safety, such as is shown in the Goucher patent. The milk may be introduced through a suitable pipe 26 and an enclosing cover 27 at the top. Similarly, at the bottom a plate 28 may have an outlet pipe 29 for removing the material from the column. Suitable valves and other control apparatus will be of course employed.

The primary feature of this invention involves introducing electricity from an electrolyte directly into the milk 18 in each reservoir. To this end, each reservoir communicates with an electrode compartment, shown particularly in Fig. 3, comprising a container 30, preferably cylindrical, which is made of glass or other suitable insulation. A suitable electrode 32, which may be made of carbon, is suspended in the electrode compartment by a screw threaded conducting terminal 33 passing through and secured to a metal cap 34 by a nut 35. The cap has a downwardly extending cylindrical flange 36 and rests on the top of the cylindrical body 30 with a loose contact which provides for the escape of gas.

The electrode 32 is immersed in a suitable electrolyte, such as an aqueous solution of sodium chloride, of adequate conductivity, and this electrolyte is separated from the milk 18 in the treatment reservoir by means of an osmotic diaphragm. As shown particularly in Fig. 4, this diaphragm 40 is a circular disc mounted between a tubular section 42 which communicates with the bottom of the electrolyte compartment 30 and a further tubular section 44 which opens directly into the compartment where the milk 18 is standing. Thus the milk fills the tube 44 and electrolyte fills the tube 42, but they are separated by the osmotic diaphragm 40.

In order to provide adequate electric conductivity as well as for removably mounting the diaphragm, the tubes 42 and 44 are provided with concave flanges 45 and 46 which have annular portions 47 and 48 provided with inner plane flange faces shaped to make adequate contact with the outer peripheral portion of the diaphragm 40. These two flanges 47 and 48 may be clamped together with the peripheral portion of the diaphragm therebetween by a suitable construction, such as a U-shaped clamp 50 having one arm engaging the flanged portion 48 and the other arm carrying a thumb screw 51 threaded therethrough and having a foot 52 which engages the other flange 47. A series of these clamps may be employed and by adequately tightening the screws 51 the diaphragm may be held in place and the two fluid compartments sealed one from another.

Various types of material may be employed for the osmotic diaphragm, such as chamois leather or other material, such as a filter paper of adequate strength and thickness or a porous ceramic plate which has such fine pores that the fluids will not pass therethrough except under osmotic pressure. It is desirable that a diaphragm may be readily cleaned and sterilized or which may be thrown away and replaced by a new and sterile disc. Hence the removability of this diaphragm 40 by means of the associated clamps 50 is important. It will be appreciated that if a strong salt solution, such as an electrolyte of sodium chloride in water is employed, this solution will not pass through the diaphragm to a material extent in the short time of contact of the rapidly flowing and swirling milk because the water of the milk or other liquid being treated will tend to flow through the diaphragm toward the liquid of the greater concentration, thus keeping the electrolyte from contaminating the milk. However, since the two liquids are in electrical contact within the porous diaphragm, the electricity may flow adequately from the electrode chamber to the reservoir. Since all parts of the electrode chamber and the interconnecting tubes are made of glass or other non-conductive material, the electricity can flow only through the fluid and thus enters the milk 18 in the reservoir without being short-circuited through the container material.

Electricity of desired voltage and amperage may be supplied to the fluid in the column by suitable electrical apparatus. As shown in Fig. 1, a source of alternating current may be connected to the terminals 60 and 61 of the primary coil 62 of a suitable step-up transformer. The secondary coil 64 may have one terminal 65 directly connected to the ground 66 and to the electrode 32 in every other electrode compartment 67 in the column. An adjustable contact 68 engaging the secondary coil is connected to the other set of electrodes represented by the single electrode in compartment 69 of Fig. 1, it being understood that any desired number of the electrode and reservoir sections may be employed. Thus the return circuit for the electricity from the central electrode to the upper and lower electrodes of Fig. 1 is made solely through the vertically flowing columns 20 of the milk, and the current can pass only within the milk in each overflow tube 16 and the descending streams 20. Since the electric current is alternating, there is no electrolytic action and the sterilization or bacteria destruction is caused by the high voltage shock as well as the heating effect that results from passing the current through the comparatively high resistance of the streams 20 of the milk.

Since the column is sealed at the top and bottom from the outside air and the electrode chambers are likewise sealed from the milk, contamination from such outside sources is eliminated. Thus the purification is effected without materially altering the taste of the milk. It will be understood that the voltage and amperage are to be regulated in accordance with the resistance provided by the streams of milk and to give a desired bacteriacidal action. Regulation of the rate of flow of the milk also varies the size of the stream 20 and its electrical resistance as well as its temperature. The stream 20 is subjected to agitation while falling and the electrical action is well distributed therein. Various other advantages are inherent in the construction.

It will also be appreciated that electricity may be introduced directly into fluid in an insulating container or reservoir of various suitable shapes and arrangements, provided a porous diaphragm separates the fluid from the electrolyte in a separate electrode or terminal compartment. Also, the electrical return circuit from an electrode through the fluid may be suitably effected at various locations, provided no electrode terminal makes direct contact with the fluid. The apparatus and method applies to the treatment of various fluids, including suspensions and emulsions, and the length and diameter of the flowing stream, as well as the voltage and amperage will be regulated according to the desired requirements. The heating effect will vary with the resistance of the fluid stream and the amperage and voltage applied, as well as the period of application as determined by the stream length or flow velocity. Hence the apparatus may be variously modified within these requirements and according to the material to be treated, within the scope of my invention.

Having thus described my invention, what I claim and desire to secure by Letters Patent is:

1. Electrical apparatus for treating a fluid comprising at least two spaced fluid holding reservoirs of non-conducting material, means providing for the passage of a continuous fluid stream forming an electrical path from one reservoir to another, means for introducing said fluid to one reservoir and removing it from the other, a separate electrode compartment having a fluid passage connecting with each reservoir and arranged to contain an electrolyte, an electrode contacting the electrolyte in each compartment, a porous diaphragm in each passage which separates the fluid of the electrode compartment from the fluid in the associated reservoir, the compartment and reservoir fluids respectively contacting opposite sides of the diaphragm and the latter providing for introducing electricity from the electrode to the reservoir fluid while restricting the passage of the electrolyte, and electrical apparatus providing a source of alternating electrical current and including terminals of opposite polarity connected respectively to the electrodes of separate compartments, so that the circuit between the electrodes is formed through said fluid stream.

2. Electrical apparatus for treating a fluid comprising a series of vertically spaced, electrically insulated reservoirs arranged for holding fluid, means for introducing said fluid into the uppermost reservoir, means providing an outlet from the lowermost reservoir, at least one reservoir having an overflow wall providing a pool of fluid and arranged to direct a continuous stream of fluid therefrom to the next lower reservoir, a series of electrode compartments, each being associated with a separate reservoir and containing an electrolyte, an electrode contacting the electrolyte in each compartment, a separate fluid containing duct connected with and arranged to be filled with fluid from each reservoir, each duct being connected with an associated electrode compartment, a porous diaphragm in each duct which separates the electrolyte from the reservoir fluid but permits the passage of electricity therebetween, and electrical apparatus comprising a step-up transformer providing a source of high voltage alternating current and including terminals of opposite polarity connecting the transformer terminals respectively with alternate electrodes of the compartment series for discharging current into each compartment electrolyte so that the electrical circuit between two electrodes is formed through the fluid stream between vertically adjacent reservoirs.

3. Apparatus according to claim 2 in which the reservoirs are arranged in a vertical column one above another, an upstanding overflow tube in each reservoir, the tubes having inlet and outlet passages out of vertical alignment in adjacent reservoirs and arranged to form a liquid pool and an overflowing stream descending from one reservoir to the pool in the reservoir below which provide for the electricity flowing from an upper pool to the one below solely through the descending fluid stream.

4. Apparatus according to claim 2 in which the electrode compartment is a vertical container and comprises means for suspending an electrode therein and providing for the egress of gas.

5. Apparatus according to claim 2 in which the duct between a reservoir and its associated electrode compartment includes an expanded diaphragm chamber and means for removably securing the diaphragm therein.

References Cited in the file of this patent

UNITED STATES PATENTS

| | | |
|---|---|---|
| 829,308 | Willson | Aug. 21, 1906 |
| 918,531 | Goucher | Apr. 20, 1909 |
| 1,145,862 | Goucher | July 6, 1915 |
| 1,147,558 | Shelmerdine | July 20, 1915 |
| 2,354,553 | Sherk | July 25, 1944 |
| 2,593,915 | Pavelka | Apr. 22, 1952 |
| 2,631,100 | Alton et al. | Mar. 10, 1953 |